(12) United States Patent
Osterling

(10) Patent No.: US 7,460,513 B2
(45) Date of Patent: Dec. 2, 2008

(54) ENCAPSULATION OF DIVERSE PROTOCOLS OVER INTERNAL INTERFACE OF DISTRIBUTED RADIO BASE STATION

(75) Inventor: Jacob Kristian Osterling, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 875 days.

(21) Appl. No.: 10/909,835

(22) Filed: Aug. 3, 2004

(65) Prior Publication Data

US 2005/0105534 A1 May 19, 2005

Related U.S. Application Data

(60) Provisional application No. 60/520,323, filed on Nov. 17, 2003, provisional application No. 60/520,324, filed on Nov. 17, 2003, provisional application No. 60/520,364, filed on Nov. 17, 2003, provisional application No. 60/520,325, filed on Nov. 17, 2003.

(51) Int. Cl.
*H04B 7/216* (2006.01)
(52) U.S. Cl. .................. 370/342; 370/208; 370/307; 370/314; 370/470; 455/522; 455/115
(58) Field of Classification Search ................ 370/342, 370/208, 307, 314, 470, 512; 455/522, 115
See application file for complete search history.

(56) References Cited

U.S. PATENT DOCUMENTS 5,870,392 A 2/1999 Ann (Continued)

FOREIGN PATENT DOCUMENTS

| EP | 1 294 045 A1 | 3/2003 |
|----|----|----|
| EP | 1 367 841 | 12/2003 |
| WO | 03/047130 A1 | 6/2003 |

OTHER PUBLICATIONS

International Search Report mailed Feb. 28, 2005 in corresponding PCT application PCT/SE2004/001675.

(Continued)

*Primary Examiner*—Minh D Dao
(74) *Attorney, Agent, or Firm*—Nixon & Vanderhye, P.C.

(57) ABSTRACT

A radio base station (20) has an internal interface (26) which connects a radio equipment (22) and a radio equipment controller (24). At least one and preferably both of the example radio equipment (22) and radio equipment controller (26) comprises a framer (50, 70) which can be controlled for transmitting samples of different protocols over the internal interface. The framer (50, 70) facilitates (1) time multiplexing of N number of frames of a first protocol over the internal interface; (2) inserting L number of samples of a second protocol into M number of the frames of the first protocol, and (3) inserting a padding sample into each frame of the first protocol which does not include a sample of the second protocol. The first protocol has a frame rate; the second protocol has a sample rate which is different from the frame rate of the first protocol, and N is greater than L and M. In any of plural example modes, the padding sample can comprise either of uninterpreted information or information related to the second protocol. For example, the padding sample can comprise a parity value for the L number of samples of the second protocol. In another embodiment and method of operation, in a distributed radio base station a radio equipment controller (REC) sums different carriers and transfers a wide band signal over the internal interface.

28 Claims, 11 Drawing Sheets

U.S. PATENT DOCUMENTS

| | | | |
|---|---|---|---|
| 6,337,659 | B1 | 1/2002 | Kim |
| 6,429,974 | B1 | 8/2002 | Thomas et al. |
| 6,434,137 | B1 | 8/2002 | Anderson et al. |
| 6,549,531 | B1 | 4/2003 | Charas |
| 6,836,660 | B1 | 12/2004 | Wala |
| 7,127,175 | B2 | 10/2006 | Mani et al. |
| 2003/0076907 | A1 | 4/2003 | Harris |
| 2003/0093540 | A1 | 5/2003 | Lioy |
| 2004/0125740 | A1* | 7/2004 | Gardner ................. 370/208 |
| 2005/0105552 | A1* | 5/2005 | Osterling .................. 370/466 |
| 2005/0107124 | A1* | 5/2005 | Osterling et al. ............. 455/561 |
| 2006/0088125 | A1* | 4/2006 | Miyatani et al. ............ 375/296 |
| 2007/0019679 | A1* | 1/2007 | Scheck et al. ............... 370/480 |
| 2007/0058742 | A1* | 3/2007 | Demarco et al. ............ 375/260 |
| 2007/0091896 | A1* | 4/2007 | Liu .......................... 370/395.5 |
| 2007/0116046 | A1* | 5/2007 | Liu et al. .................... 370/466 |
| 2007/0133477 | A1* | 6/2007 | Ebert et al. ................. 370/335 |
| 2007/0147488 | A1* | 6/2007 | Han ............................ 375/222 |
| 2007/0160012 | A1* | 7/2007 | Liu ............................ 370/334 |

OTHER PUBLICATIONS

International Search Report mailed Mar. 1, 2005 in corresponding PCT application No. PCT/SE2004/001673.
International Search Report mailed Feb. 28, 2005 in corresponding PCT application PCT/SE2004/001674.
Common Public Radio Interface (CPRI) Interface Specification Version 1.2 (Sep. 26, 2003).
Common Public Radio Interface (CPRI) Interface Specification Version 1.1 (May 10, 2004).

* cited by examiner

ENCAPSULATION OF DIVERSE PROTOCOLS OVER INTERNAL INTERFACE OF DISTRIBUTED RADIO BASE STATION

This application claims the benefit and priority of the following United States Provisional Patent Applications, all of which are incorporated herein by reference: (1) U.S. Provisional Application 60/520,323, entitled "Encapsulation of Diverse Protocols Over Internal Interface of Distributed Radio Base Station"; (2) U.S. patent application Ser. No. 60/520,324, entitled "Encapsulation of Independent Transmissions Over Internal Interface of Distributed Radio Base Station"; (3) U.S. patent application Ser. No. 60/520,364, entitled "Interface, Apparatus, and Method for Cascaded Radio Units In A Main-Remote Radio Base Station"; and, (4) U.S. Pat. Appl. 60/520,325, entitled "Pre-Start-Up Procedure For Internal Interface of Distributed Radio Base Station". This application is related to the following simultaneously filed United States Patent applications, all of which are incorporated by reference herein in their entirety: (1) U.S. patent application Ser. No. 10/909,836, entitled "Encapsulation of Independent Transmissions Over Internal Interface of Distributed Radio Base" and (2) U.S. patent application Ser. No. 10/909,843, entitled "Pre-Start-Up Procedure For Internal Interface of Distributed Radio Base Station".

BACKGROUND

1. Field of the Invention

This application is related to radio access networks involved in wireless telecommunications, and particularly relates to an internal interface (such as the Common Public Radio Interface (CPRI)) of a radio base station which links a radio equipment portion of the radio base station to a radio equipment control portion of the base station.

2. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a radio base station. A cell is a geographical area where radio coverage is provided by the radio equipment at a base station site. Each cell is identified by a unique identity, which is broadcast in the cell. The radio base stations communicate over the air interface (e.g., radio frequencies) with the user equipment units (UE) within range of the base stations. In the radio access network, several base stations are typically connected (e.g., by landlines or microwave) to a control node known as a base station controller (BSC) or radio network controller (RNC). The control node supervises and coordinates various activities of the plural radio base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which, at least in some respects, builds upon the radio access technology known as Global System for Mobile communications (GSM) developed in Europe. UTRAN is essentially a radio access network providing wideband code division multiple access (WCDMA) to user equipment units (UEs).

In many radio access networks the radio base station is a concentrated node with essentially most of the components being located at concentrated site. In the future mobile network operators may be afforded more flexibility if the radio base station is configured with a more distributed architecture. For example, a distributed radio base station can take the form of one or more radio equipment portions that are linked to a radio equipment control portion over a radio base station internal interface.

One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface Specification Version 1.0 (Sep. 26, 2003) and Version 1.1 (May 10, 2004), and which are incorporated by reference herein in their entirety.

The Common Public Radio Interface (CPRI) is time multiplexed with one frame per WCDMA chip period, i.e. a frame rate of 3.84 Mframes/s. Each CPRI frame can carry one or more samples. But other protocols, i.e., protocols other than WCDMA, have other frame or chip rates. The Common Public Radio Interface (CPRI) therefore does not invite transfer of samples for other protocols.

What is needed therefore, and an object of the present invention, is a technique for rendering an internal interface of a radio base station node compatible with diverse protocols.

BRIEF SUMMARY

A radio base station has an internal interface which connects a radio equipment (RE) and a radio equipment controller (REC). At least one and preferably both of the example radio equipment (RE) and radio equipment controller (REC) comprises a framer which can be controlled for transmitting samples of different protocols over the internal interface. The framer facilitates (1) time multiplexing of N number of frames of a first protocol over the internal interface; (2) inserting L number of samples of a second protocol into M number of the frames of the first protocol, and (3) inserting a padding sample into each frame of the first protocol which does not include a sample of the second protocol. The first protocol has a frame rate; the second protocol has a sample rate which is different from the frame rate of the first protocol, and N is greater than L and M.

In illustrated, representative, non-limiting example modes, the internal interface is a Common Public Radio Interface (CPRI) and the frame rate of the first protocol is 3.84 Mframes/second.

In a first such example mode, the sample rate of the second protocol (e.g., CDMA 2000) is 3.6864 Mchips/second, with N being 25 and L and M being 24.

In a second example mode, the sample rate of the second protocol (e.g., CDMA One) is 1.2288 Mchips/second, with N being 25 and L being 8. As one implementation of this second mode, M is 8, and the M number of frames of the first protocol are the first, fourth, seventh, tenth, thirteenth, sixteenth, nineteenth, and twenty second frames.

In a third example mode, the sample rate of the second protocol (e.g., CDMA One) is 1.2288 Mchips/second, and the framer uses the second protocol for K number of carriers whereby samples for each carrier of the second protocol are included in M/K number of frames of the first protocol. As one example implementation of this third mode, K is 3, N is 25, and M is 24.

In a fourth example mode, the sample rate of the second protocol (e.g., CDMA One) is 1.2288 Mchips/second, and each sample of the second protocol has J number of bits. The framer includes the J number of bits of each second protocol sample in F number of frames of the first protocol, J and F being integers. In an example implementation of the fourth mode, N is 25, L is 8; J is 14, and F is 3, and at least some of the M number of frames of the first protocol have J/F bits.

In any of the example modes, the padding sample can comprise either of uninterpreted information or information related to the second protocol. For example, the padding sample can comprise a parity value for the L number of samples of the second protocol.

In another embodiment and method of operation, in a distributed radio base station a radio equipment controller (REC) sums different carriers and transfers a wide band signal over the internal interface.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
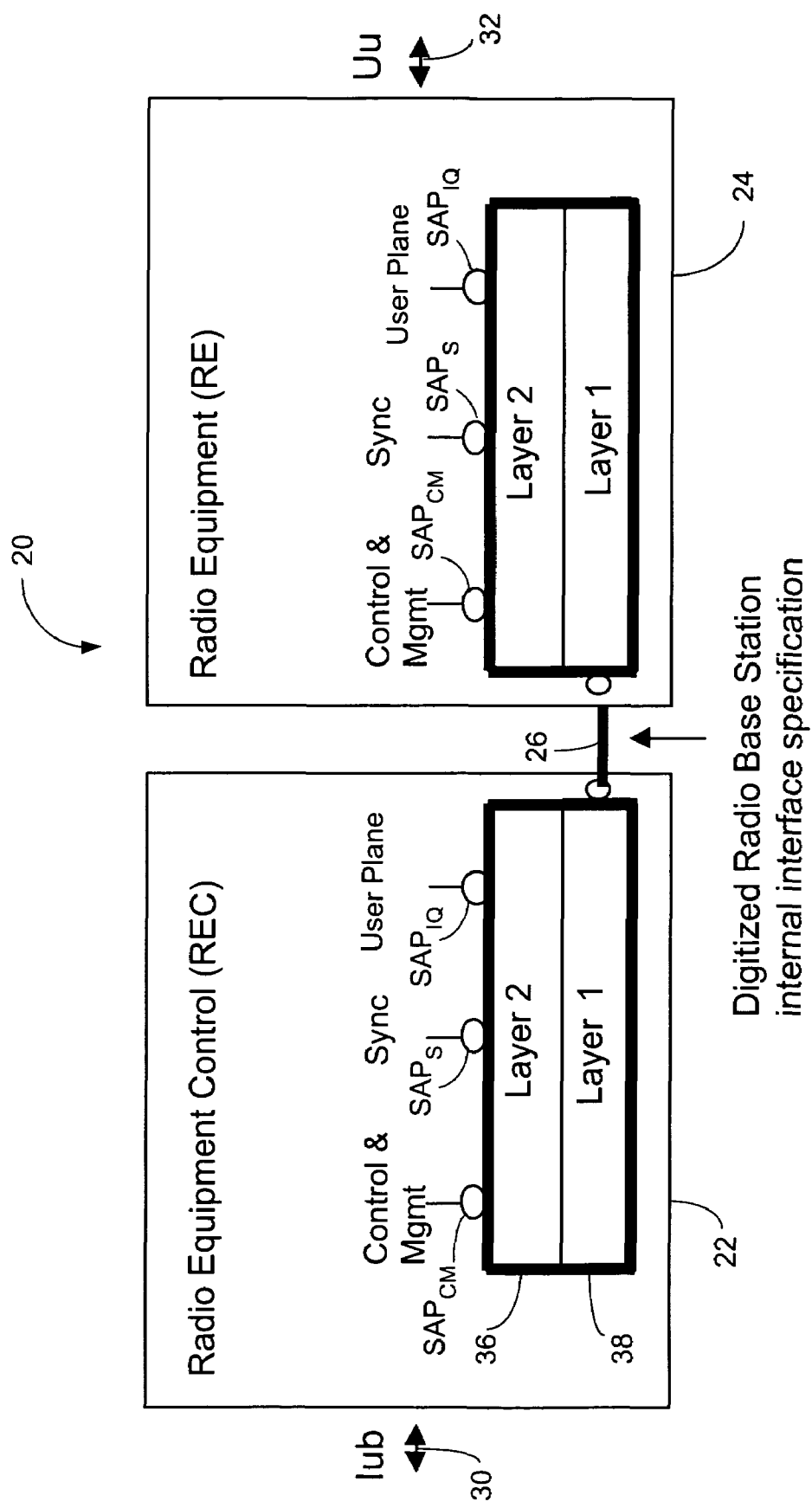
FIG. 1 is a schematic view of an example embodiment of a distributed radio base station.

FIG. 1 shows an example embodiment of a distributed radio base station 20. The radio base station 20 comprises both a radio equipment controller (REC) 22 and a radio equipment (RE) 24. The radio equipment controller (REC) 22 and radio equipment (RE) 24 are connected by an internal interface 26. In the example implementation herein described, internal interface 26 is a CPRI link. Details of structure and operation of radio base station 20 and an internal interface 26 which takes the form of a CPRI link are understood from the Common Public Radio Interface Specification Version 1.0 (Sep. 26, 2003) and Version 1.1 (May 10, 2004), which are incorporated by reference herein in their entirety. As in the specification, the description herein is based on the UMTS (Universal Mobile Telecommunication System) nomenclature. However, the radio base station 20 and the internal interface 26 may operate in accordance with other radio standards.

The radio equipment controller (REC) 22 and radio equipment (RE) 24 may be physically separated (i.e., the radio equipment (RE) 24 may be close to the antenna, whereas the radio equipment controller (REC) 22 may be located in a conveniently accessible site). Alternatively, both radio equipment controller (REC) 22 and radio equipment (RE) 24 may be co-located as in a conventional radio base station design.

As illustrated in FIG. 1, radio equipment controller (REC) 22 provides an access towards an unillustrated Radio Network Controller via the Iub interface 30 (for the UMTS radio access network). Basically, the radio equipment controller (REC) 22 is concerned with the Iub transport and Iub protocols, the Node B (base station) control and management, as well as the digital baseband processing. For the downlink (i.e., from radio equipment controller (REC) 22 to radio equipment (RE) 24), the radio equipment controller (REC) 22 handles such operations as channel coding, interleaving, spreading, scrambling, adding of physical channels, controlling transmit power of each physical channel, frame and slot signal generation (including clock stabilization). For the uplink (i.e., from radio equipment (RE) 24 to radio equipment controller (REC) 22), the radio equipment controller (REC) 22 handles such operations as channel de-coding, de-interleaving, de-spreading, de-scrambling, signal distribution to signal processing units, detection of feedback information for transmit power control, and signal to interference ratio measurement.

The radio equipment (RE) 24 serves the air interface 32 to the user equipment (in an UMTS network the air interface is called the Uu interface). The user equipment unit, or mobile station, is not illustrated in FIG. 1. The radio equipment (RE)

24 provides the analogue and radio frequency functions such as filtering, modulation, frequency conversion and amplification. For the downlink, the radio equipment (RE) 24 performs operations such as digital to analogue conversion, up conversion, on/off control of each carrier, carrier multiplexing, power amplification and limiting, antenna supervision, and RF filtering. For the uplink, the radio equipment (RE) 24 performs operations such as analogue to digital conversion, down conversion, automatic gain control, carrier de-multiplexing, low noise amplification, and RF filtering.

Thus, the radio equipment controller (REC) 22 comprises the radio functions of the digital baseband domain, whereas the radio equipment (RE) 24 contains the analogue radio frequency functions. The functional split between both parts is done in such a way that a generic interface based on In-Phase and Quadrature (IQ) data can be defined.

The Common Public Radio Interface Specification Version 1.0 (Sep. 26, 2003) and Version 1.1 (May 10, 2004) define protocols for the physical layer 38 (layer 1) and the data link layer 36 (layer 2). Layer 1 defines, e.g., electrical characteristics, optical characteristics, time division multiplexing of the different data flows, and low level signaling. Layer 2 defines the media access control, flow control and data protection of the control and management information flow.

Figure 2:
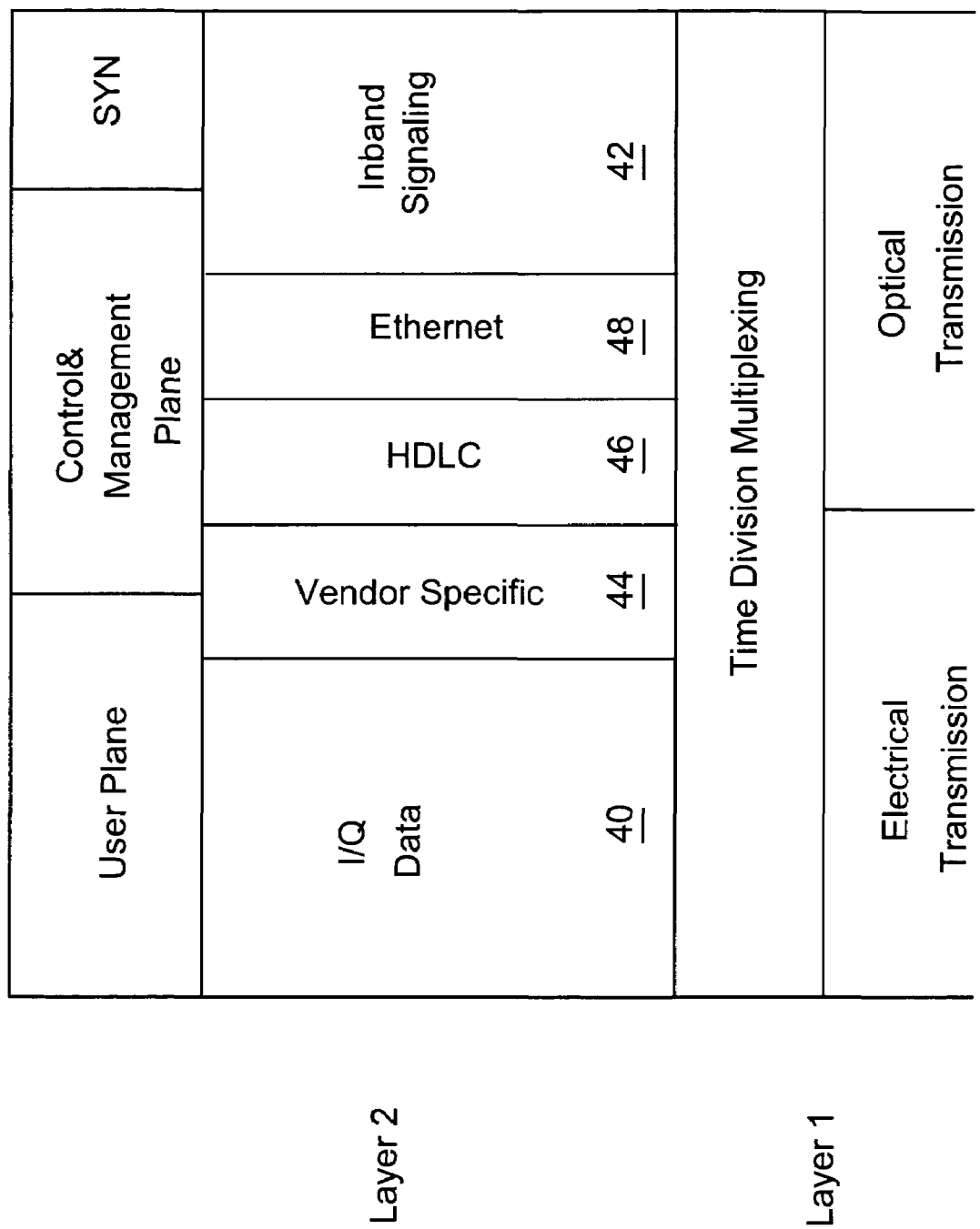
FIG. 2 is a diagrammatic view of a protocol overview for an interface between radio equipment controller (REC) 22 and a radio equipment (RE) 24.

The Common Public Radio Interface Specification Version 1.0 (Sep. 26, 2003) and Version 1.1 (May 10, 2004) further describe four protocol data planes: control plane, management plane, user plane, and synchronization. These four protocol data planes are illustrated in FIG. 2.

The control plane involves control data flow used for call processing. The management plane carries management information for the operation, administration and maintenance of the CPRI link and the radio equipment (RE) 24. The control and management data is exchanged between control and management entities with the radio equipment controller (REC) 22 and radio equipment (RE) 24, and is given to higher protocol layers. The control and management plane is mapped to a single information flow over the CPRI link.

The user plane concerns data that has to be transferred from the radio base station to the mobile station and vice versa. The user plane data is transported in the form of in-phase and quadrature (IQ) modulation data (digital base band signals), represented by block 40 in FIG. 2. Several IQ data flows will be sent via one physical CPRI link 26. Each IQ data flow reflects the data of one antenna for one carrier, the so-called antenna-carrier (AxC). In general, without regard to specific protocol, one antenna-carrier is the amount of digital baseband (IQ) U-plane data necessary for either reception of transmission of one carrier at one independent antenna element. An AxC container contains the IQ samples of one AxC for one UMTS chip duration. Each flow in the user plane has reserved a certain bit field per frame, denoted as the AxC carrier. When the internal interface 26 is a CPRI interface, the AxC container contains samples of a chip an a UTRA-FDD carrier.

Synchronization pertains to data flow which transfers synchronization and timing information between radio equipment controller (REC) 22 and radio equipment (RE) 24. Synchronization data is used for alignment of the 8B/10B coder as well as the detection of chip, hyperframe, radio frame boundaries, and associated frame numbering.

Inband signaling, depicted by block 42 in FIG. 2, is signaling information that is related to the link and is directly transported by the physical layer. This information is required, e.g. for system startup, layer 1 link maintenance and the transfer of time critical information that has a direct time relationship to layer 1 user data.

Block 44 of FIG. 2 shows vendor specific information, i.e., an information flow which is reserved for vendor specific information.

There are service access points (SAP) for all protocol data plane layer 2 services which are used as reference points for performance measurements. As illustrated in FIG. 1, for both radio equipment controller (REC) 22 and radio equipment (RE) 24 there are service access points $SAP_{CM}$, $SAP_S$, and $SAP_{IQ}$ for the control & management planes, the synchronization plane, and the user plane, respectively.

Thus, in addition to the user plane data (IQ data), control and management as well as synchronization signals have to be exchanged between radio equipment controller (REC) 22 and radio equipment (RE) 24. All information streams are multiplexed onto a digital serial communication line using appropriate layer 1 and layer 2 protocols. The different information flows have access to the layer 2 via the appropriate service access points (SAPs). These information streams define the common public radio interface.

The IQ data of different antenna carriers are multiplexed by a time division multiplexing scheme onto an electrical or optical transmission line forming the internal interface 26. The Control and Management data are either sent as inband signalling (for time critical signalling data) or by layer 3 protocols (not defined by Common Public Radio Interface Specification Version 1.0 (Sep. 26, 2003) and Version 1.1 (May 10, 2004)) that reside on top of appropriate layer 2 protocols. Two different layer 2 protocols—High Data Level Link Control (HDLC) and Ethernet, depicted as 46 and 48, respectively, in FIG. 2—are supported by CPRI. These additional control and management data are time multiplexed with the IQ data. Finally, additional time slots are available for the transfer of any type of vendor specific information (block 42).

Figure 3A:
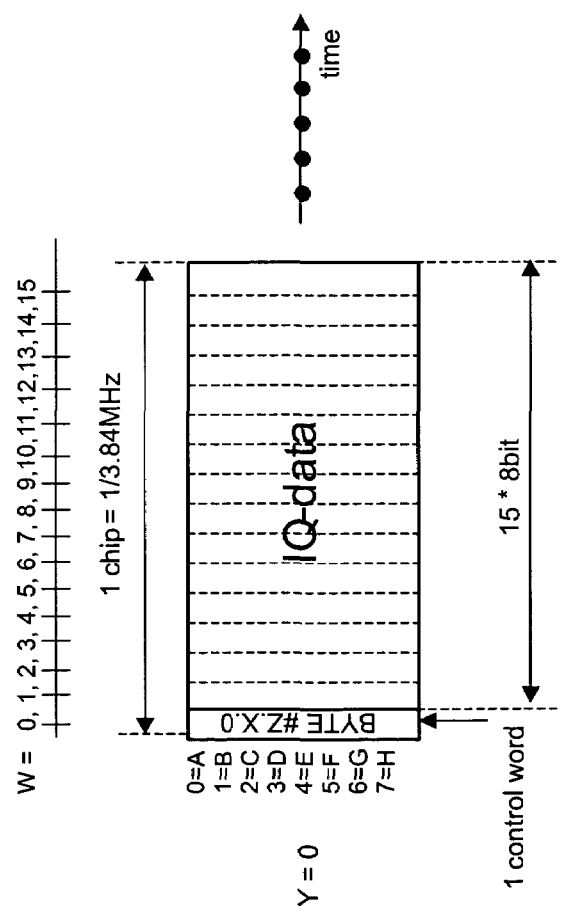
FIG. 3A is a diagrammatic view of basic frame structure for one example data rate for use over an internal interface for the distributed base station.

Information flow over the internal interface 26 of radio base station 20 is carried in frames. In the example implementation which is compatible with Common Public Radio Interface Specification Version 1.0 (Sep. 26, 2003) and Version 1.1 (May 10, 2004), the length of a basic frame is 1 Tchip=1/3.84 MHz=260.416667 ns. As shown in FIG. 3A, for such compatible implementation a basic frame consists of 16 words with index W=0 . . . 15. The word with the index W=0, 1/16 of the basic frame, is used for one control word. The length T of the word depends on the total data rate. The Common Public Radio Interface Specification Version 1.0 (Sep. 26, 2003) and Version 1.1 (May 10, 2004) define three alternative data rates, each with differing word lengths: 614.4 Mbit/s (length of word T=8); 1228.8 Mbit/s (length of word T=16); and 2457.6 Mbit/s (length of word T=32). FIG. 3A illustrates the frame structure for the 614.4 Mbit/s total data rate.

Figure 3B:
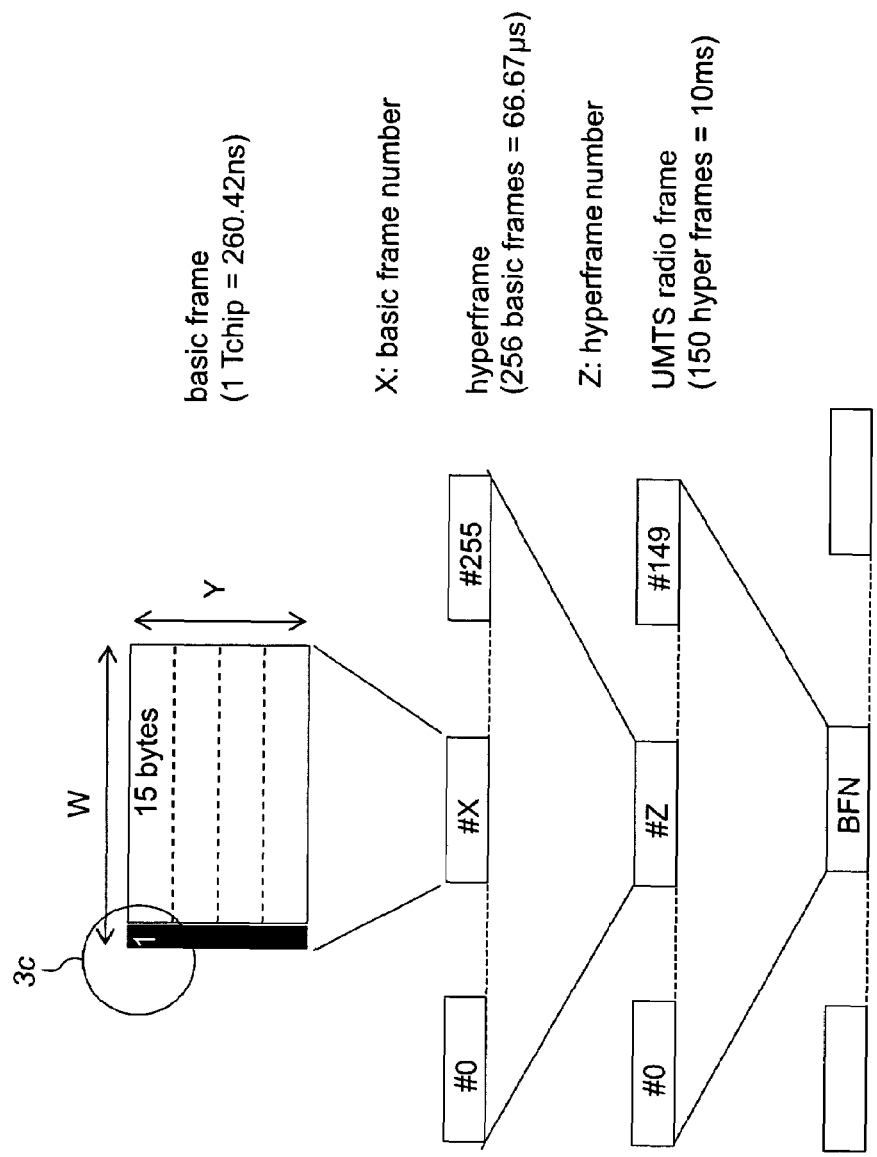
FIG. 3B is a diagrammatic view of a hyperframe structure for one example implementation.
Figure 3C:
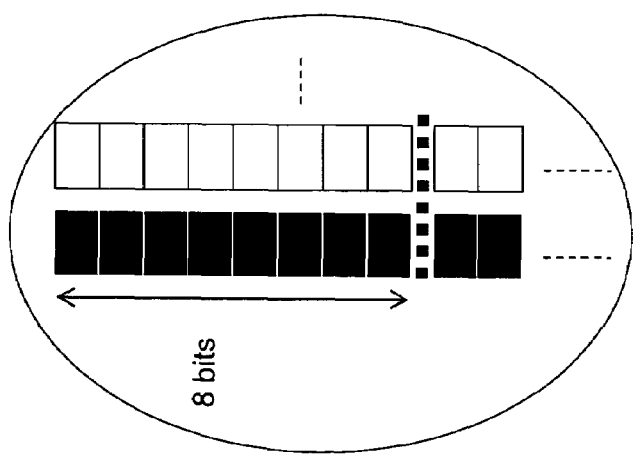
FIG. 3C is an enlargement of a portion of FIG. 3B.

The Common Public Radio Interface Specification Version 1.0 (Sep. 26, 2003) and Version 1.1 (May 10, 2004) also define a hyperframe structure which is hierarchically embedded between the basic frame and the UMTS radio frame as shown in FIG. 3B. In FIG. 3B, Z in the hyperframe number; X is the basic frame number within a hyperframe; W is the word number within a basic frame; and Y is the byte number within a word. The control word is defined as word with rank W=0. Each bit within a word can be addressed with the index B, where B=0 is the LSB of the BYTE Y=0, B=8 is the LSB of BYTE Y=1, B=16 is the LSB of BYTE Y=2, and B=24 is the LSB of BYTE Y=3.

Figure 4:
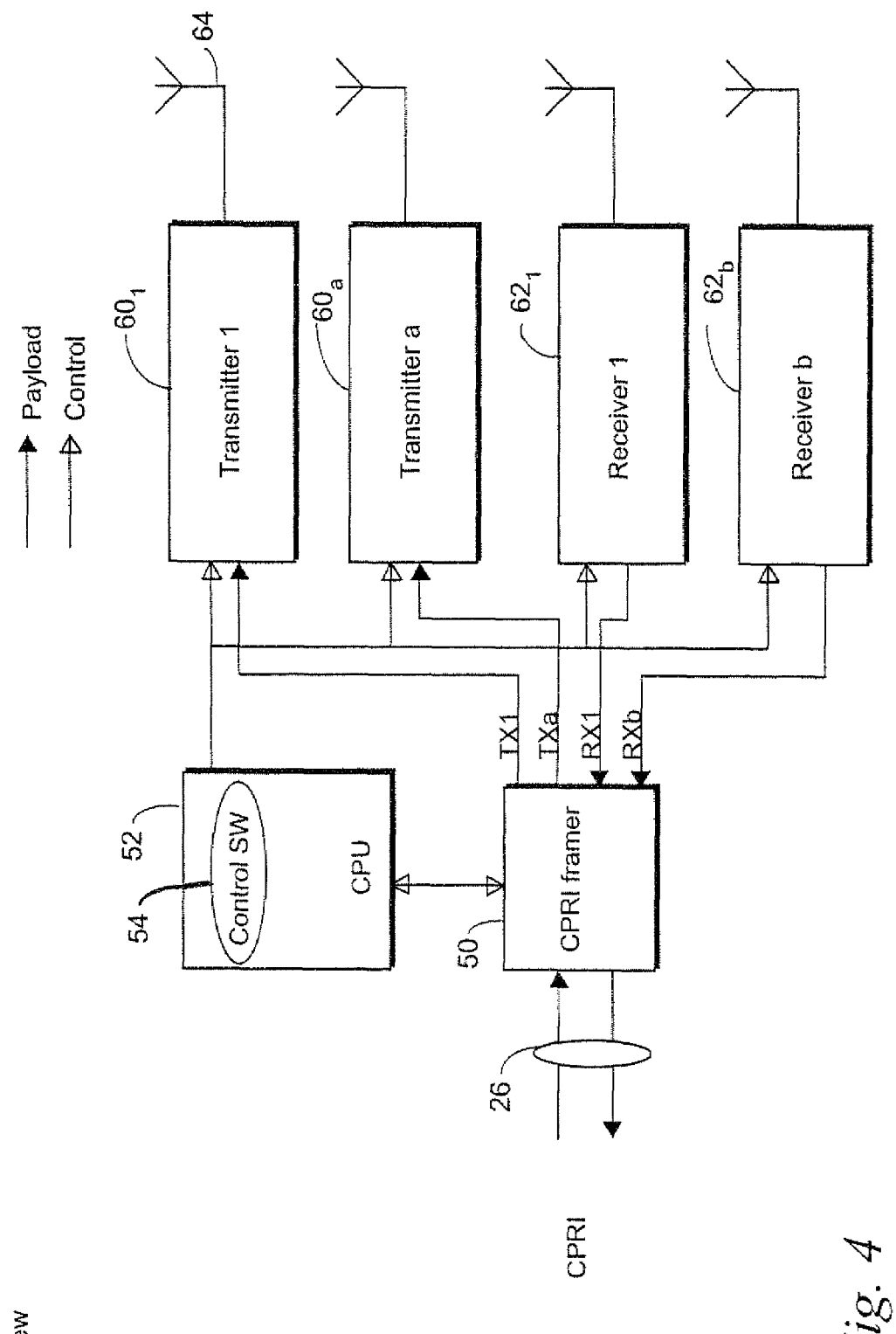
FIG. 4 is a schematic view of selected aspects of an example radio equipment (RE) portion of the distributed radio base station of FIG. 1.

FIG. 4 shows pertinent basic aspects of an example radio equipment (RE) 24 as comprising a framer 50 which is ultimately connected to internal interface 26, i.e., the CPRI interface. The framer 50 works in conjunction with a CPU or processor 52 of radio equipment (RE) 24. The processor 52 executes control software (SW) 54 which governs operation, e.g., of framer 50 and terminates the application layer communication towards the radio equipment controller (REC) 22. In addition, radio equipment (RE) 24 comprises plural transmitters (such as transmitter $60_1$ and transmitter $60_a$), and plural receivers (such as receiver $62_1$ and receiver $62_b$). The transmitters 60 and receivers 62 can be either single-standard or multistandard. Each transmitter 60 and each receiver 62 is connected to a corresponding antenna 64 (which is distinct from and does not comprise radio equipment (RE) 24). The framer 50 is connected to forward payload information obtained from internal interface 26 to each of the transmitters 60 (as shown by lines terminated with solid arrowheads), and to receive information from each of the receivers 62 to be forwarded from radio equipment (RE) 24 over the internal interface 26 to radio equipment controller (REC) 22 (again as indicated by lines terminated with solid arrowheads, but having a reverse direction toward rather than away from framer 50). The processor 52 is connected to send control information or control signals to each of framer 50, the transmitters 60, and the receivers 62, as shown by lines terminated with non-solid arrowheads).

Figure 5:
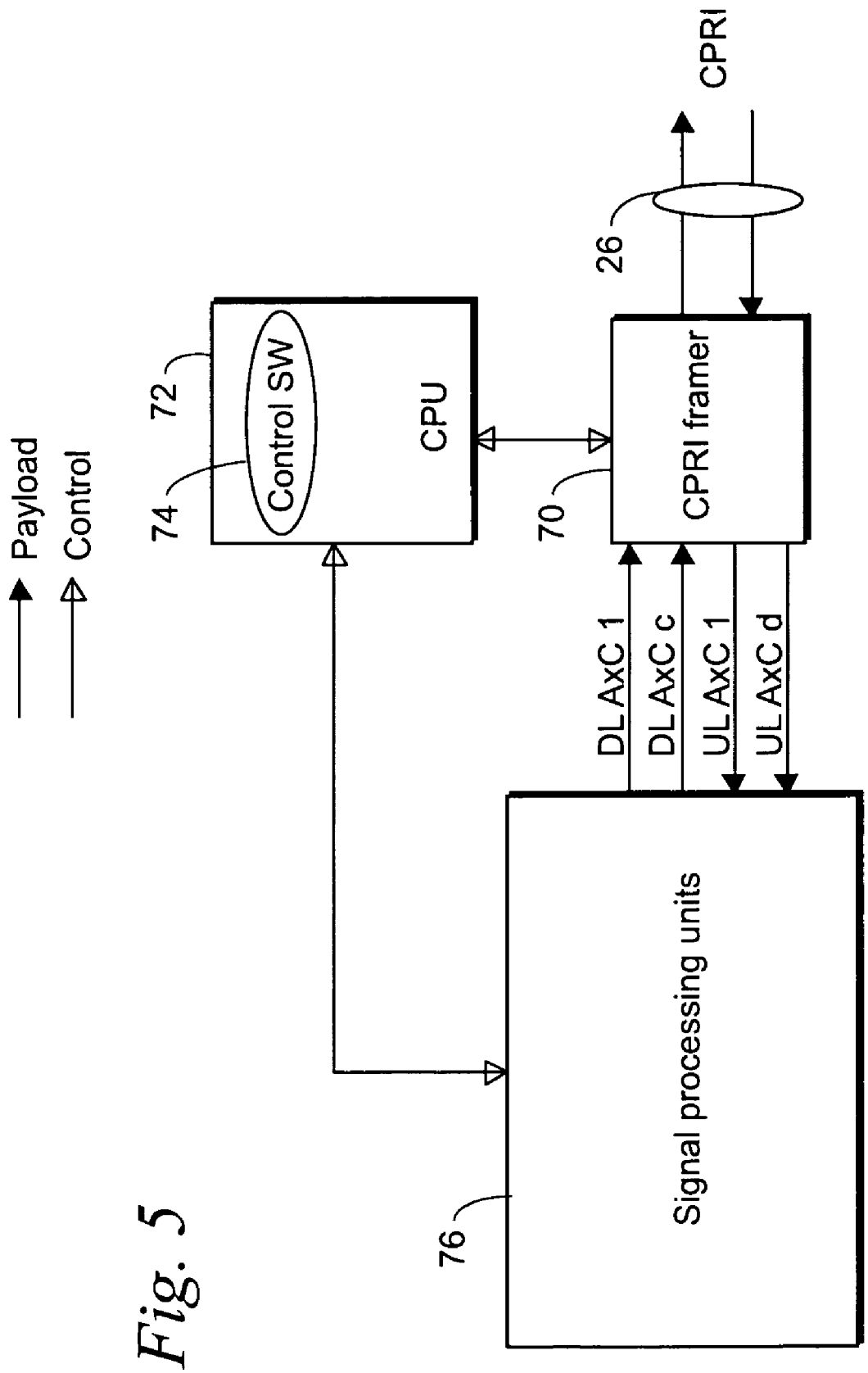
FIG. 5 is a schematic view of selected aspects of a radio equipment controller (REC) portion of the distributed radio base station of FIG. 1.

FIG. 5 shows pertinent basic aspects of an example radio equipment controller (REC) 22 as comprising a framer 70 which is ultimately connected to internal interface 26, i.e., the CPRI interface. The framer 70 works in conjunction with a CPU or processor 72 of radio equipment controller (REC) 22. The processor 72 executes control software (SW) 74 which governs operation, e.g., of framer 70. In addition, radio equipment controller (REC) 22 comprises signal processing units collectively indicated as 76 in FIG. 5. The radio equipment controller (REC) 22 of FIG. 5 is shown as handling antenna carriers (AxC) AxC 1 and AxC c on the downlink (DL), and antenna carriers (AxC) AxC 1 and AxC d on the uplink (UL).

As mentioned above, the Common Public Radio Interface (CPRI) is time multiplexed with one frame per WCDMA chip period, i.e. a frame rate of 3.84 Mframes/s, with each CPRI frame carrying one or more samples. But other protocols, i.e., protocols other than WCDMA, have other frame or chip rates. As now explained, the present invention facilitates the Common Public Radio Interface (CPRI) accommodating transfer of samples for other protocols.

Advantageously, the at least one and preferably both of the example radio equipment controller (REC) 22 and the example radio equipment (RE) 24 comprises framers (e.g., framer 50 and framer 70, respectively) which can be controlled for transmitting samples of different protocols over the internal interface 26. As a general rule, the framer 50 and framer 70 both facilitate (1) time multiplexing of N number of frames of a first protocol over the internal interface; (2) inserting L number of samples of a second protocol into M number of the frames of the first protocol, and (3) inserting a padding sample into each frame of the first protocol which does not include a sample of the second protocol. The first protocol has a frame rate; the second protocol has a sample rate, and N is greater than L and M, with L, M, and N all being integers.

Hereinafter are described various representative, non-limiting example modes of transmitting samples of different protocols over the internal interface 26, with the internal interface 26 being a Common Public Radio Interface (CPRI) and the frame rate of the first protocol being 3.84 Mframes/second. Thus, the CPRI has a frame rate which happens to be the same as the WCDMA chip rate. It should be understood that the principles of the present invention are not confined to the Common Public Radio Interface (CPRI), but are applicable to any internal interface 26 of a distributed base station.

Figure 7:
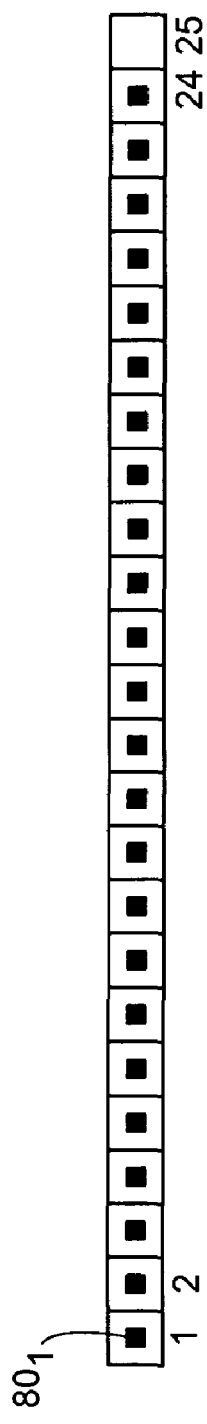
FIG. 7 is a diagrammatic view of a first mode of transmitting samples of different protocols over the internal interface.

FIG. 7 illustrates a first example mode of transmitting samples of a different protocol over the internal interface 26. In the first example mode, the second protocol is CDMA 2000, for which the chip rate (i.e., sample rate) is 3.6864 Mchips/second. In this first mode, N is 25 and L and M are 24. Thus, in this first mode twenty four CDMA 2000 samples $80_1$, are inserted in twenty four CPRI frames, one sample $80_1$ per chip (i.e. per frame), as indicated by the frames of FIG. 7 which have solid internal squares depicting samples $80_1$. The last CPRI frame (chip) does not contain a CDMA 2000 sample $80_1$, but instead is a padding frame which carries a padding sample. That is, in the last CPRI frame the corresponding AxC container contains padding.

Thus, in the first mode, to transfer CDMA 2000 over the CPRI interface 26, extra samples are inserted at a rate of one extra sample per twenty four CDMA 2000 samples. The CDMA 2000 carrier can be transferred over the interface at the same time as WCDMA carriers are transferred, rendering internal interface 26 a multistandard interface.

As in other modes herein described, the padding sample can comprise either of uninterpreted information or information related to the second protocol. For example, the padding sample can comprise a parity value for the L number of samples of the second protocol.

Figure 8:
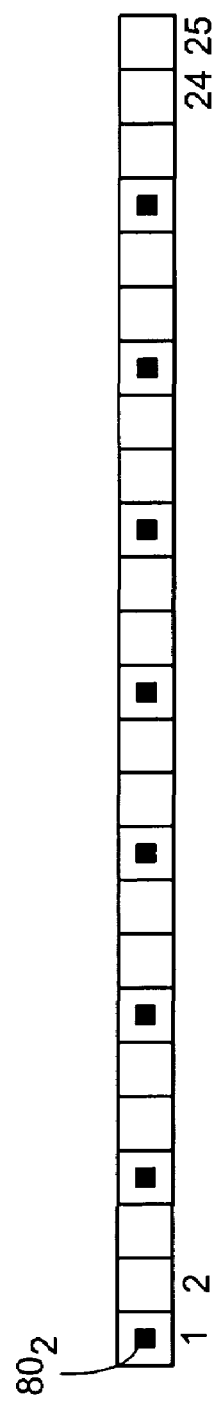
FIG. 8 is a diagrammatic view of a second mode of transmitting samples of different protocols over the internal interface.

FIG. 8 illustrates a second example mode of transmitting samples $80_2$ of a different protocol over the internal interface 26. In the second example mode, the second protocol is CDMA One (e.g., IS-95), for which the chip rate (i.e., sample rate) is 1.2288 Mchips/second. In this second mode, N is 25 and L is 8. Thus, in this second mode, eight CDMA One samples $80_2$ are inserted in eight CPRI frames, one sample $80_2$ per chip (i.e. per frame) of the eight involved CPRI frames, as indicated by the frames of FIG. 8 which have solid internal squares depicting samples $80_2$. As one implementation of this second mode and as shown in FIG. 8, M is 8, with the frames of the first protocol which host the second protocol samples being the first, fourth, seventh, tenth, thirteenth, sixteenth, nineteenth, and twenty second first protocol frames. In the FIG. 8 illustration, the AxC containers for seventeen of the first protocol frames contain padding.

The technique of the second mode (CDMA One (e.g., IS-95)) can also be utilized for CDMA 2000 1x, which uses the same chip rate (e.g., sample rate) as CDMA One.

Figure 9:
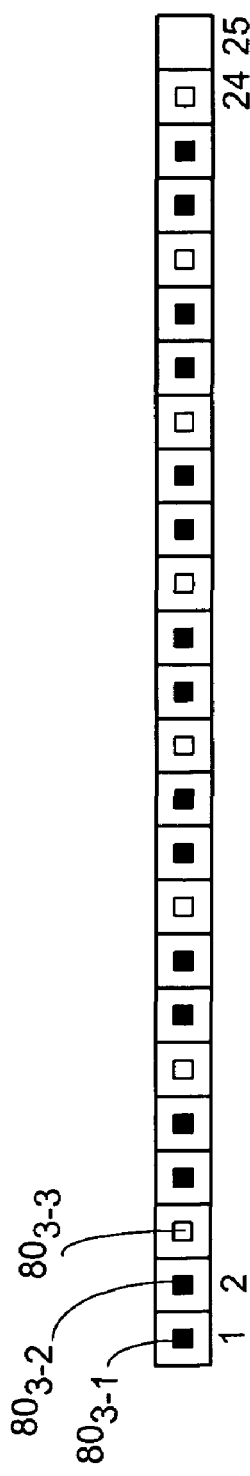
FIG. 9 is a diagrammatic view of a third mode of transmitting samples of different protocols over the internal interface.

FIG. 9 illustrates a third example mode of transmitting samples $80_{3-1}$, $80_{3-2}$, and $80_{3-3}$ of a different protocol over the internal interface 26. As in the second mode, in the third example mode the second protocol is CDMA One (e.g., IS-95), for which the chip rate (i.e., sample rate) is 1.2288 Mchips/second. In the third example mode, the framer 50 and framer 70 use the second protocol for K number of carriers. Specifically, samples for each of K number of carriers of the second protocol are included in M/K number of frames of the first protocol.

In an illustrated, non-limiting example in which there are three carriers (K=3), and wherein N is 25, and M is 24, each carrier uses every third first protocol frame. FIG. 9 illustrates a first carrier of the second protocol as having eight samples $80_{3-1}$ (in first protocol frames 1, 4, 7, 10, 13, 16, 19, and 22); a second carrier of the second protocol as having eight samples $80_{3-2}$ (in first protocol frames 2, 5, 8, 11, 14, 17, 20, and 23); and, a third carrier of the second protocol as having eight samples $80_{3-3}$ (in first protocol frames 3, 6, 9, 12, 15, 18, 21, and 24); followed by a padding sample in the last first protocol frame. This third example mode thus illustrates an example of interleaving of second protocol carriers over the internal interface 26. The three second protocol carriers are fitted in the same space as one carrier for the first protocol (e.g., for WCDMA).

Figure 10:
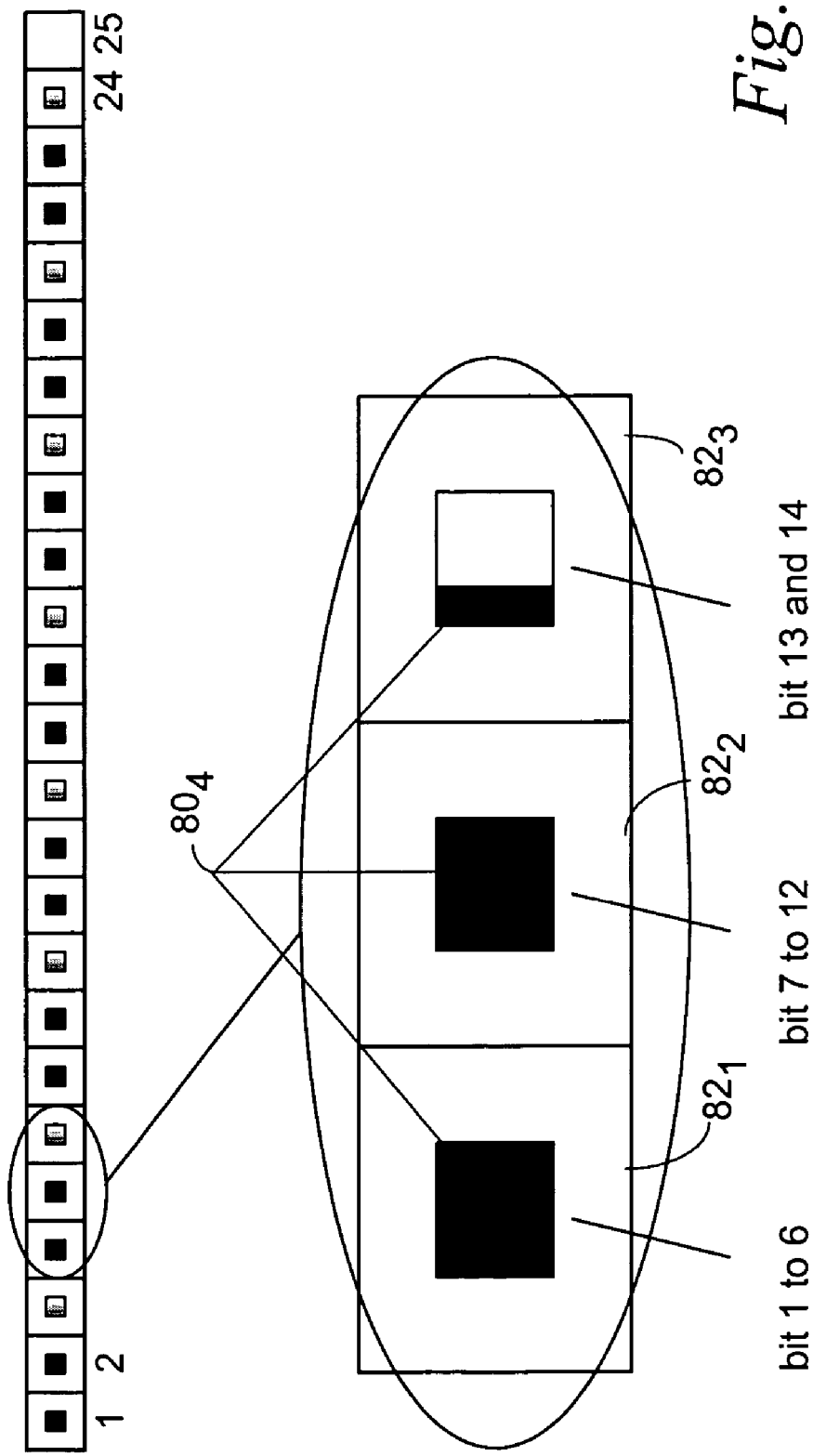
FIG. 10 is a diagrammatic view of a fourth mode of transmitting samples of different protocols over the internal interface.

FIG. 10 illustrates a fourth example mode of transmitting samples $80_4$ of a different protocol over the internal interface 26. As in the second mode and the third mode, in the fourth example mode the second protocol is CDMA One (e.g., IS-95), for which the chip rate (i.e., sample rate) is 1.2288 Mchips/second. In the four example mode, the framer 50 and the framer 70 include J number of bits of each second protocol sample in F number of frames of the first protocol, J and F being integers. In the particular example implementation of the fourth mode shown in FIG. 10, N is 25, L is 8; J is 14, and F is 3.

Thus, the technique of the fourth mode is to subdivide each sample $80_4$ into about F number (e.g., 3) parts and to transfer the about 1/F (e.g., ⅓) of the sample in each first protocol (CPRI) basic frame. The adoption to the CPRI rate is done by adding some padding bits. An implementation of the fourth mode is to map the J number of bits of each second protocol sample into F number of first protocol frames, wherein the AxC container size would be at least J/F rounded up to the nearest even integer (so that the AxC container always has an even length). The AxC container of the last first protocol frame would then not carry any information.

For example, if the number of bits of each second protocol sample is 14 (J=14), then each second protocol sample $80_4$ can be split into three AxC containers each having a length of six bits. These three AxC containers are preferably inserted into three consecutive first protocol frames, with a first of the six bits of the second protocol sample $80_4$ being included in a first of the first protocol frames (e.g., first protocol frame $82_1$), the next six bits of the second protocol sample $80_4$ being included in a second of the first protocol frames (e.g., first protocol frame $82_2$), and the last two bits of the second protocol sample $80_4$ being included in a third of the first protocol frames (e.g., first protocol frame $82_3$).

The apparatus and methods herein describe makes possible use of an internal interface 26 such as the CPRI for other protocols, such as for CDMA2000, thereby rendering internal interface 26 for multistandard usage. Interleaving techniques, such as that described in the third example modes, allows for yet other standards to also be transferred over the interface, such as GSM and CDMA One. Advantageously, all example modes and solutions involve minimized queuing.

Figure 6:
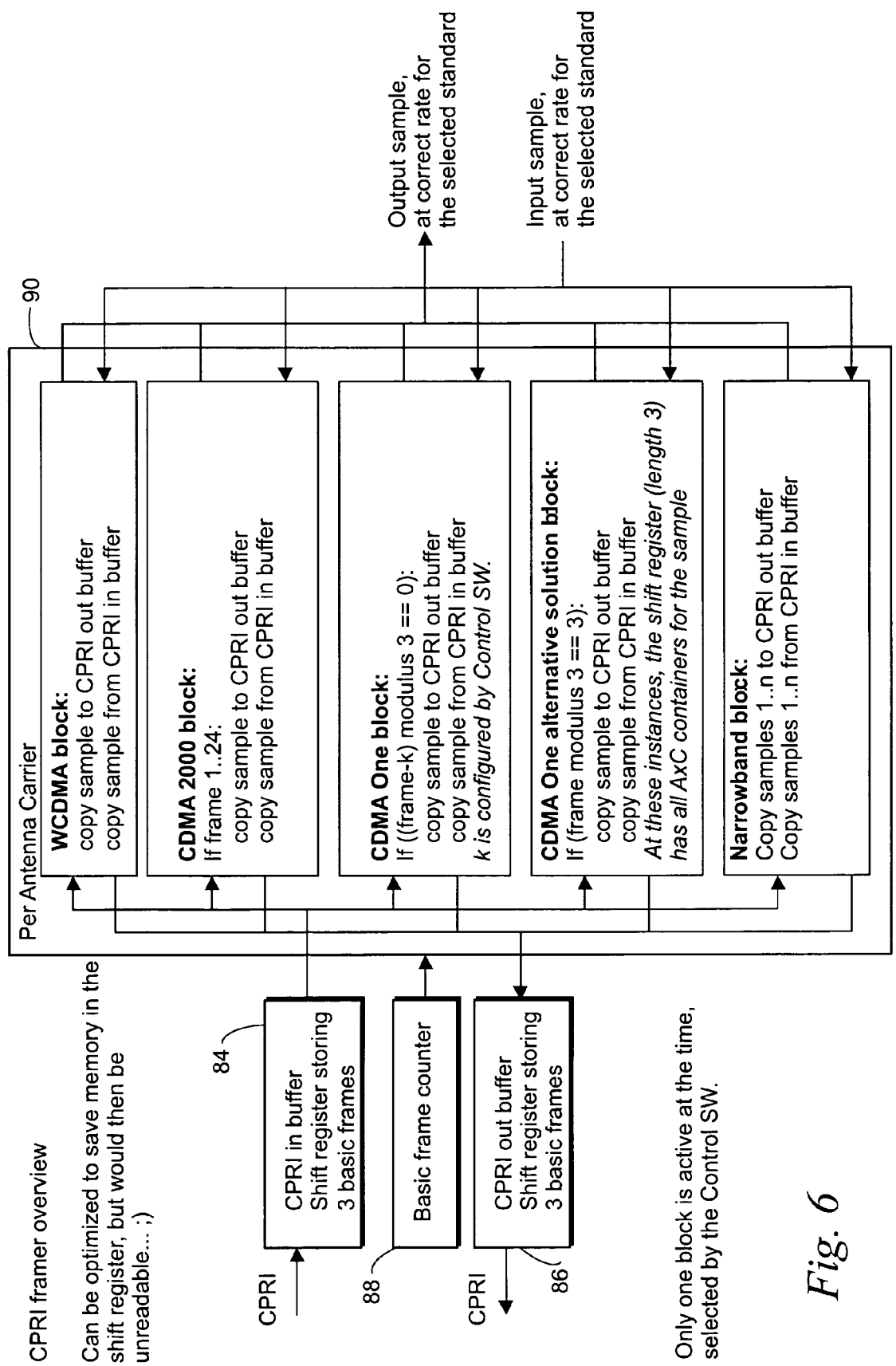
FIG. 6 is a schematic view of selected aspects of a framer for either a radio equipment controller (REC) or a radio equipment (RE).

Selected aspects of the framer 50 of radio equipment (RE) 24 and the framer 70 of radio equipment controller (REC) 22 which facilitate transmission of samples of different protocols over the internal interface 26 are illustrated in FIG. 6. Each of framer 50 and framer 70 are shown as operating in conjunction with an internal interface in-buffer 84 (e.g., CPRI in-buffer); an internal interface out-buffer 86; and, a basic frame counter 88. The framer is shown has having, for each antenna carrier (AxC), logic 90 for handling different protocols or modes. The framer handles only one block as being active at a time the block being selected by the control software (SW).

The radio equipment controller (REC) 22 decides what standard the radio equipment (RE) 24 shall transmit and receive, i.e., which protocol standard shall be utilized over the internal interface 26. The radio equipment controller (REC) 22 then sends a command to the radio equipment (RE) 24 to start transmitting a carrier and/to start receiving a carrier. The command includes an indication of what frequency is to be used for transmission and receipt, and which standard to use. The framer 50 and framer 70 of the radio equipment controller (REC) 22 and radio equipment (RE) 24, respectively, encode/extract the samples in accordance with the chosen protocol standard. Many other operations may be performed at radio equipment controller (REC) 22 and radio equipment (RE) 24 depending on the particular protocol standard which has been chosen by radio equipment controller (REC) 22 (such as, for example, pulse shaping filtering). Concerning encoding and extracting, the radio equipment controller (REC) 22 samples the RF signal and does the proper filtering, and then simply maps the samples according to the selected scheme. The radio equipment (RE) 24 extracts the samples according to the selected schemes and then treats them as any other samples from that standard. For each protocol standard there is a flow of samples at a known rate. This flow is encoded over the internal interface 26 in a way that gives minimum extra delay and minimum complexity.

In radio equipment (RE) 24, the control software (SW) 54 executed by processor 52 configures each of the transmitters 60, the receivers 62, and the framer 50 in accordance with the standard and specific CPRI format specified in commands received over internal interface 26 from radio equipment controller (REC) 22. Similarly, in radio equipment controller (REC) 22 the control software (SW) 74 executed by processor 72 configures the signal processing units 76 and framer 70 in accordance with the standard and specific CPRI format to use for each antenna carrier, based on the desired configuration at the moment. The framer 70 converts between the CPRI format and the format suitable for the transmitter/receiver based on the selected standard for each antenna carrier.

Figure 11:
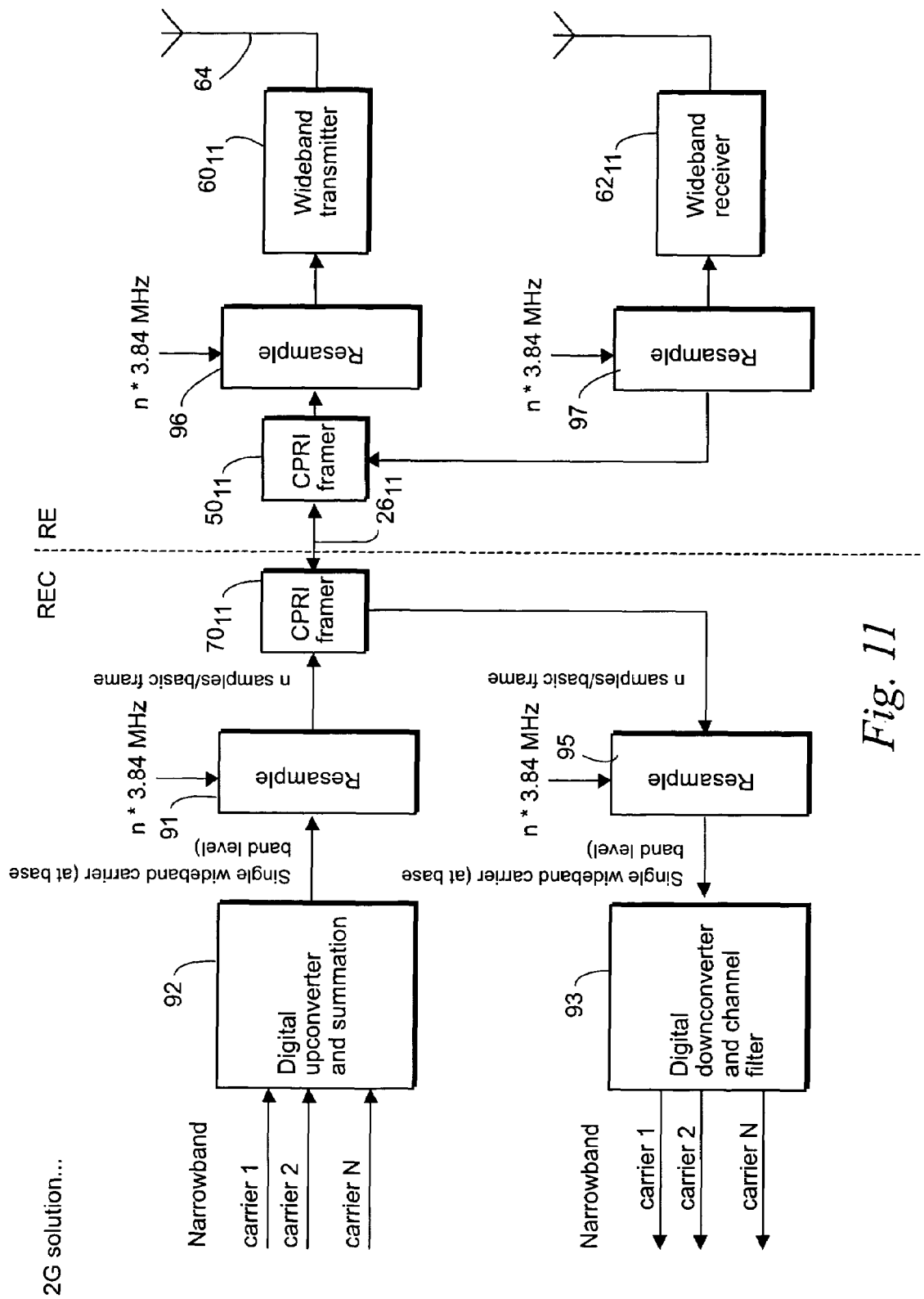
FIG. 11 is a schematic view of a distributed radio base station wherein a radio equipment controller (REC) sums different carriers and transfers a wide band signal over the internal interface.

In yet another embodiment and mode of operation illustrated in FIG. 11, data can be transferred between radio equipment controller (REC) 22 and radio equipment (RE) 24 by summing the different carriers in the radio equipment controller (REC) 22 and transferring a wide band signal over the internal interface 26. For example, if there are six GSM carriers over a 5 MHz spectrum, the 5 MHz spectrum can be generated in the radio equipment controller (REC) 22 and transferred as a single flow of samples over the internal interface 26.

In FIG. 11, the transmitter $60_{11}$, and receiver $62_{11}$, are of a wideband character (e.g., can transmit or receive more than one channel), and transmitter $60_{11}$ is a multi-carrier transmitter. The narrow band carriers are digitally up-converted in radio equipment controller (REC) 22 by digital upconverter and summer 92, and digitally down-converted in radio equipment controller (REC) 22 by digital downconverter and summer 93. FIG. 11 shows a generic embodiment with separate functional blocks converting between an arbitrary band width and a band width based on 3.84 MHz. These blocks are denoted resamplers as their basic task is to change the sample rate between the incoming and outgoing signals by means of signal processing, and are present on both uplink (95, 97) and downlink (91, 96). The functional blocks can be removed as separate blocks by basing the upconverter 92, downconverter 93, transmitter 60 and receiver 62 on a multiple of 3.84 MHz.

As an example of the generic (non-optimized) solution, six 200 kHz carriers can be put on a 5 MHz spectrum. The 5 MHz base band signal is resampled (by resampler 95) to a 3.84 MHz based frequency. That is, the 5 MHz spectrum is sampled by 3*3.84=11.52 MHz, forming three samples per basic frame. The corresponding AxC container on the interface 26 is therefore of size 3*sample size. The corresponding inversive function is performed by a resampler 96 which converts the signal back to the original sample rate of the 5 MHz base band signal. On the uplink of the generic solution, the resampling is performed in resampler 97 in the RE, transferred over the interface 26 and then resampled again in the REC by resampler 95. More optimized, the D/A converter of transmitter 60 and the A/D converter of the receiver 62 should work on 11.52 MHz and the digital upconverter 92 and downconverter 93 should also work on 11.52 MHz. Resamplers 91, 95, 96 and 97 would then be obsolete.

Figure 12:
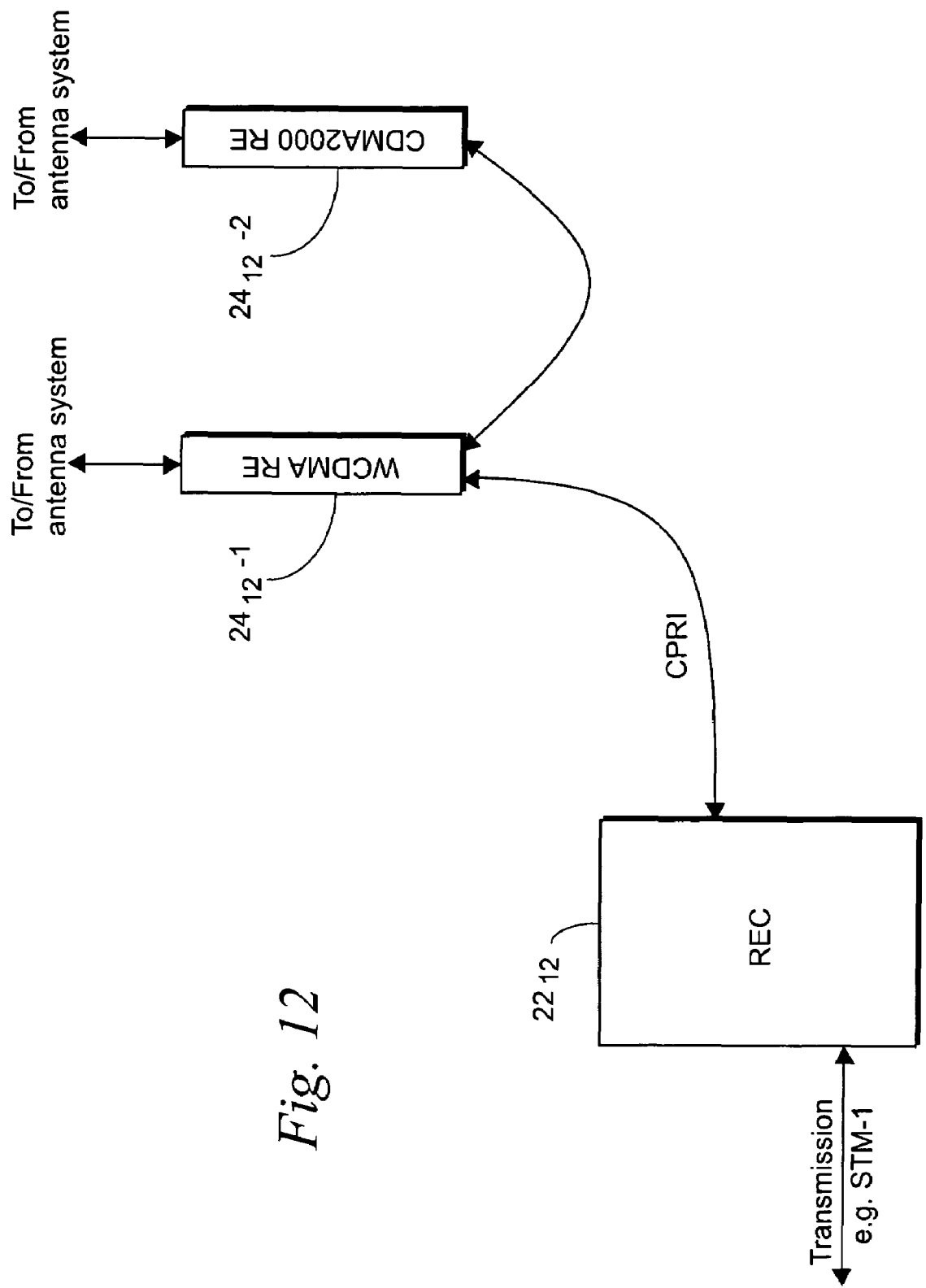
FIG. 12 is a diagrammatic view showing an example embodiment of a distributed radio base station which has a cascading of radio equipments.

FIG. 12 shows an example distributed radio base station 20$_{12}$ which has a cascading of radio equipments. In the example embodiment of FIG. 12, the radio equipment controller (REC) 22$_{12}$ is connected by internal interface 26 to a first radio equipment (RE) 24$_{12}$-1. The first radio equipment (RE) 24$_{12}$-1 utilizes a first protocol such as WCDMA. The first radio equipment (RE) 24$_{12}$-1 is connected by a link 99 to second radio equipment (RE) 24$_{12}$-2. The second radio equipment (RE) 24$_{12}$-2 utilizes a second protocol such as CDMA 2000. In the embodiment of FIG. 12, the same internal interface 26 is used to transfer CDMA 2000 antenna-carriers to second radio equipment (RE) 24$_{12}$-2 and to transfer WCDMA antenna-carriers to first radio equipment (RE) 24$_{12}$-1. Cascading of radio equipments (RE) is understood with reference to U.S. patent application Ser. No. 60/520,364, entitled "Interface, Apparatus, and Method for Cascaded Radio Units In A Main-Remote Radio Base Station", which is incorporated herein by reference.

Figure 13A:
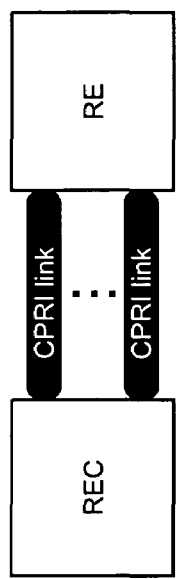
FIG. 13A is a diagrammatic view showing several internal interface physical links connecting a radio equipment controller (REC) and a radio equipment (RE).
Figure 13B:
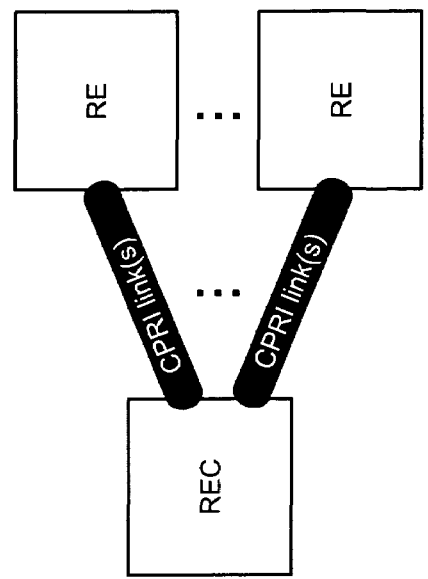
FIG. 13B is a diagrammatic view showing several radio equipment entities (RE) being served by one radio equipment controller (REC).

The technology has been described in a basic configuration in which one radio equipment controller (REC) 22 and one radio equipment (RE) 24 are connected by a single CPRI physical link. The invention is not limited to this configuration, but should be understood to be extended to other configurations including but not limited to those described in Common Public Radio Interface Specification Version 1.0 (Sep. 26, 2003) and Version 1.1 (May 10, 2004). For example, as illustrated in FIG. 13A, the invention may be implemented in a configuration in which several CPRI physical links can be used to enhance the system capacity required for large system configurations involving many antennas and carriers. Moreover, as illustrated in FIG. 13B, several radio equipment entities may be served by one radio equipment controller (REC) 22.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A method of operating a radio base station having an internal interface connecting a radio equipment (RE) and a radio equipment controller (REC), the method comprising:
   time multiplexing N number of frames of a first protocol over the internal interface, the first protocol having a frame rate;
   inserting L number of samples of a second protocol into M number of the frames of the first protocol, the second protocol having a sample rate which is different from the frame rate of the first protocol, N being greater than L and M, with L, M, and N all being integers;
   inserting a padding sample into each frame of the first protocol which does not include a sample of the second protocol.

2. The method of claim 1, wherein the internal interface is a Common Public Radio Interface (CPRI), wherein the frame rate of the first protocol is 3.84 Mframes/second; wherein the sample rate of the second protocol is 3.6864 Mchips/second; wherein N is 25; and wherein L and M are 24.

3. The method of claim 1, wherein the internal interface is a Common Public Radio Interface (CPRI), wherein the frame rate of the first protocol is 3.84 Mframes/second; and wherein the sample rate of the second protocol is 1.2288 Mchips/second.

4. The method of claim 3, wherein the second protocol is one of CDMA One and CDMA 2000 1x.

5. The method of claim 3, wherein N is 25 and L is 8.

6. The method of claim 5, wherein M is 8, and wherein the M number of frames of the first protocol are the first, fourth, seventh, tenth, thirteenth, sixteenth, nineteenth, and twenty second frames.

7. The method of claim 1, wherein the internal interface is a Common Public Radio Interface (CPRI), wherein the frame rate of the first protocol is 3.84 Mframes/second; wherein the sample rate of the second protocol is 1.2288 Mchips/second; and further comprising using the second protocol for K number of carriers whereby samples for each carrier of the second protocol are included in M/K number of frames of the first protocol.

8. The method of claim 7, wherein K is three.

9. The method of claim 7, wherein N is 25 and M is 24.

10. The method of claim 1, wherein the internal interface is a Common Public Radio Interface (CPRI), wherein the frame rate of the first protocol is 3.84 Mframes/second; wherein the sample rate of the second protocol is 1.2288 Mchips/second; wherein each sample of the second protocol has J number of bits; and wherein the method further comprises including the J number of bits of each second protocol sample in F number of frames of the first protocol, J and F being integers.

11. The method of claim 10, wherein N is 25, L is 8; J is 14, and F is 3.

12. The method of claim 11, wherein at least some of the M number of frames of the first protocol have J/F bits.

13. The method of claim 1, wherein the padding sample comprises one of uninterpreted information and information related to the second protocol.

14. The method of claim 1, wherein the padding sample comprises a parity value for the L number of samples of the second protocol.

15. A radio base station having an internal interface connecting a radio equipment (RE) and a radio equipment controller (REC), at least one of the example radio equipment (RE) and radio equipment controller (REC) comprising a framer which (1) time multiplexes N number of frames of a first protocol over the internal interface, the first protocol having a frame rate; (2) inserts L number of samples of a second protocol into M number of the frames of the first protocol, the second protocol having a sample rate which is different from the frame rate of the first protocol, N being greater than L and M, with L, M, and N all being integers; and (3) inserts a padding sample into each frame of the first protocol which does not include a sample of the second protocol.

16. The apparatus of claim 15, wherein the internal interface is a Common Public Radio Interface (CPRI), wherein the frame rate of the first protocol is 3.84 Mframes/second; wherein the sample rate of the second protocol is 3.6864 Mchips/second; wherein N is 25; and wherein L and M are 24.

17. The apparatus of claim 15, wherein the internal interface is a Common Public Radio Interface (CPRI), wherein the frame rate of the first protocol is 3.84 Mframes/second; and wherein the sample rate of the second protocol is 1.2288 Mchips/second.

18. The apparatus of claim 17, wherein the second protocol is one of CDMA One and CDMA 2000 1x.

19. The apparatus of claim 17, wherein N is 25 and L is 8.

20. The apparatus of claim 19, wherein M is 8, and wherein the M number of frames of the first protocol are the first, fourth, seventh, tenth, thirteenth, sixteenth, nineteenth, and twenty second frames.

21. The apparatus of claim 15, wherein the internal interface is a Common Public Radio Interface (CPRI), wherein the frame rate of the first protocol is 3.84 Mframes/second; wherein the sample rate of the second protocol is 1.2288 Mchips/second; and wherein the framer uses the second protocol for K number of carriers whereby samples for each carrier of the second protocol are included in M/K number of frames of the first protocol.

22. The apparatus of claim 21, wherein K is three.

23. The apparatus of claim 21, wherein N is 25 and M is 24.

24. The apparatus of claim 15, wherein the internal interface is a Common Public Radio Interface (CPRI), wherein the frame rate of the first protocol is 3.84 Mframes/second; wherein the sample rate of the second protocol is 1.2288 Mchips/second; wherein each sample of the second protocol has J number of bits; and wherein the framer includes the J number of bits of each second protocol sample in F number of frames of the first protocol, J and F being integers.

25. The apparatus of claim 24, wherein N is 25, L is 8; J is 14, and F is 3.

26. The apparatus of claim 25, wherein at least some of the M number of frames of the first protocol have J/F bits.

27. The apparatus of claim 15, wherein the padding sample comprises one of uninterpreted information and information related to the second protocol.

28. The apparatus of claim 15, wherein the padding sample comprises a parity value for the L number of samples of the second protocol.

* * * * *

UNITED STATES PATENT AND TRADEMARK OFFICE
CERTIFICATE OF CORRECTION

PATENT NO. : 7,460,513 B2
APPLICATION NO. : 10/909835
DATED : December 2, 2008
INVENTOR(S) : Osterling It is certified that error appears in the above-identified patent and that said Letters Patent is hereby corrected as shown below:

In Column 1, Line 23, delete "Base"" and insert -- Base Station" --, therefor.

In Column 4, Line 46, delete "lub" and insert -- Iub --, therefor.

In Column 4, Line 48, after "with the" delete "lub" and insert -- Iub --, therefor.

In Column 4, Line 48, after "and" delete "lub" and insert -- Iub --, therefor.

Signed and Sealed this

Twenty-seventh Day of October, 2009

David J. Kappos
*Director of the United States Patent and Trademark Office*